United States Patent

US 8,864,598 B2
Worobets et al. (45) Date of Patent: Oct. 21, 2014

(54) METHOD FOR MATCHING GOLFERS WITH GOLF CLUB SHAFTS

(71) Applicant: Taylor Made Golf Company, Inc., Carlsbad, CA (US)

(72) Inventors: Jay Tofin Worobets, Calgary (CA); Darren John Stefanyshyn, Calgary (CA)

(73) Assignee: Taylor Made Golf Company, Inc., Carlsbad, CA (US)

(*) Notice: Subject to any disclaimer, the term of this patent is extended or adjusted under 35 U.S.C. 154(b) by 87 days.

(21) Appl. No.: 13/723,894

(22) Filed: Dec. 21, 2012

(65) Prior Publication Data
US 2014/0179454 A1    Jun. 26, 2014

(51) Int. Cl.
A63B 57/00    (2006.01)
A63B 69/36    (2006.01)
A63B 59/00    (2006.01)

(52) U.S. Cl.
CPC .............. *A63B 69/36* (2013.01); *A63B 59/0074* (2013.01)
USPC .......................................... 473/219; 473/407

(58) Field of Classification Search
USPC ................................. 473/219, 407
See application file for complete search history.

(56) References Cited

U.S. PATENT DOCUMENTS

| 4,685,682 | A * | 8/1987 | Isabell ........................... 473/282 |
| 7,041,014 | B2  | 5/2006 | Wright et al. |
| 7,887,440 | B2  | 2/2011 | Wright et al. |
| 2005/0079932 | A1 * | 4/2005 | Voges et al. ................... 473/407 |
| 2011/0207560 | A1  | 8/2011 | Wright et al. |

OTHER PUBLICATIONS

"Performance Fitting System," retrieved on Dec. 20, 2012, http://www.mizunousa.com/golf/innovation/performance-fitting-system (2 pages).

* cited by examiner

*Primary Examiner* — Dmitry Suhol
*Assistant Examiner* — Carl V Larsen
(74) *Attorney, Agent, or Firm* — Klarquist Sparkman, LLP

(57) ABSTRACT

Disclosed herein are exemplary methods and systems for selecting a shaft flex for a golfer based on characteristics of the golfer's swing. Some exemplary methods comprise using measuring in-swing-plane shaft deflection values of a golfer's golf club during the golfer's swing, determining a phase of the golfer's swing when maximum in-swing-plane shaft deflection occurs; determining a kick velocity of the golfer's swing at impact with a golf ball; and selecting a shaft flex for the golfer based on the determined phase of the golfer's swing when maximum in-swing-plane shaft deflection occurs and based on the determined kick velocity of the golfer's swing at impact with a golf ball.

17 Claims, 17 Drawing Sheets

| | L | A | R | S | X |
|---|---|---|---|---|---|
| Butt Flex [mm] | 112.8 | 103.2 | 91.0 | 80.5 | 70.0 |
| Frequency [Hz] | 217.0 | 229.0 | 241.0 | 253.0 | 269.0 |
| Ratio of Tip to Butt Flex | 1.59 | 1.56 | 1.56 | 1.63 | 1.62 |
| Torsional Deflection [°] | 4.9 | 4.6 | 4.7 | 4.6 | 5.0 |
| Swing Weight [g] | 24.9 | 23.5 | 24.0 | 24.0 | 24.1 |
| Length [in] | 42 2/16 | 42 2/16 | 42 4/16 | 42 2/16 | 42 2/16 |
| Mass [g] | 51.2 | 49.0 | 50.8 | 51.8 | 53.0 |
| Inertia [kg-m^2] | 0.00503 | 0.00513 | 0.00522 | 0.00534 | 0.00535 |

METHOD FOR MATCHING GOLFERS WITH GOLF CLUB SHAFTS

FIELD

This application relates to methods for selecting golf club shafts for golfers.

SUMMARY

Disclosed herein are exemplary methods and systems for selecting a shaft flex for a golfer based on characteristics of the golfer's swing. Some exemplary methods comprise measuring in-swing-plane shaft deflection values of a golfer's golf club during the golfer's swing, determining a phase of the golfer's swing when maximum in-swing-plane shaft deflection occurs; determining a kick velocity of the golfer's swing at impact with a golf ball; and selecting a shaft flex for the golfer based on the determined phase of the golfer's swing when maximum in-swing-plane shaft deflection occurs and based on the determined kick velocity of the golfer's swing at impact with a golf ball.

In some methods, determining a phase of the golfer's swing when maximum in-swing-plane shaft deflection occurs comprises determining whether the maximum shaft deflection occurs near the top of the golfer's backswing or during the golfer's downswing, and/or determining whether kick velocity at impact is positive or negative.

In some methods, selecting a shaft flex for the golfer comprises selecting one of a plurality of different shaft flexes, such as a group of five different shaft flexes. For example, a group of five different shaft flexes can comprise a ladies shaft flex, a seniors shaft flex, a regular shaft flex, a stiff shaft flex, and an extra stiff shaft flex, each of which has a different flexibility. Any other group of plural different shaft flex options can also be employed.

In some methods, the selected shaft flex provides the greatest clubhead speed at impact for the golfer relative to the other shaft flexes.

Some methods further comprise categorizing the golfer's swing into one of the following four swing groups: (a) maximum shaft deflection occurs at or near top of backswing and kick velocity at impact is positive; (b) maximum shaft deflection occurs at or near top of backswing and kick velocity at impact is negative; (c) maximum shaft deflection occurs during downswing and kick velocity at impact is positive; and (d) maximum shaft deflection occurs during downswing and kick velocity at impact is negative.

The selection of a shaft flex for the golfer can be based on the swing group of the golfer's swing. For example, selecting a shaft flex for the golfer can comprise selecting a most flexible shaft flex from among a group of available shaft flexes if the golfer's swing is categorized in swing group (a), selecting any available shaft flex if the golfer's swing is categorized in swing group (b), selecting any available shaft flex if the golfer's swing is categorized in swing group (c); and/or selecting a relatively less flexible shaft flex from among a group of available shaft flexes if the golfer's swing is categorized in swing group (d).

Exemplary golf measuring systems are also disclosed herein. An exemplary system can comprise a golf swing data collection system configured to measure in-swing-plane shaft deflection values of a golfer's golf club during the golfer's swing, and a computing system configured to determine a phase of the golfer's swing when maximum in-swing-plane shaft deflection occurs, determine a kick velocity of the golfer's swing at impact with a golf ball, and select a shaft flex for the golfer based on the determined phase of the golfer's swing when maximum in-swing-plane shaft deflection occurs and based on the determined kick velocity of the golfer's swing at impact with a golf ball. Such a system can also be configured to perform other methods disclosed herein.

The foregoing and other objects, features, and advantages of the invention will become more apparent from the following detailed description, which proceeds with reference to the accompanying figures.

BRIEF DESCRIPTION OF THE DRAWINGS

FIG. 4 shows characteristics of various shafts of differing flexibility.

DETAILED DESCRIPTION

Disclosed herein are methods and systems for selecting a shaft flexibility, or shaft flex, for a golfer based on the golfer's swing characteristics. The disclosed methods can be implemented by people, such as a clubfitter, and/or by a computerized system. The golfer's swing characteristics can include values for various swing metrics over the course of the golfer's swing. Exemplary metrics for a golfer's swing can include shaft deflection, swing speed, kick velocity, and clubhead speed. The golfer's swing can be categorized based on one or more swing metrics and a shaft flexibility can be selected for the golfer based on such a categorization, as described below.

Figure 1:
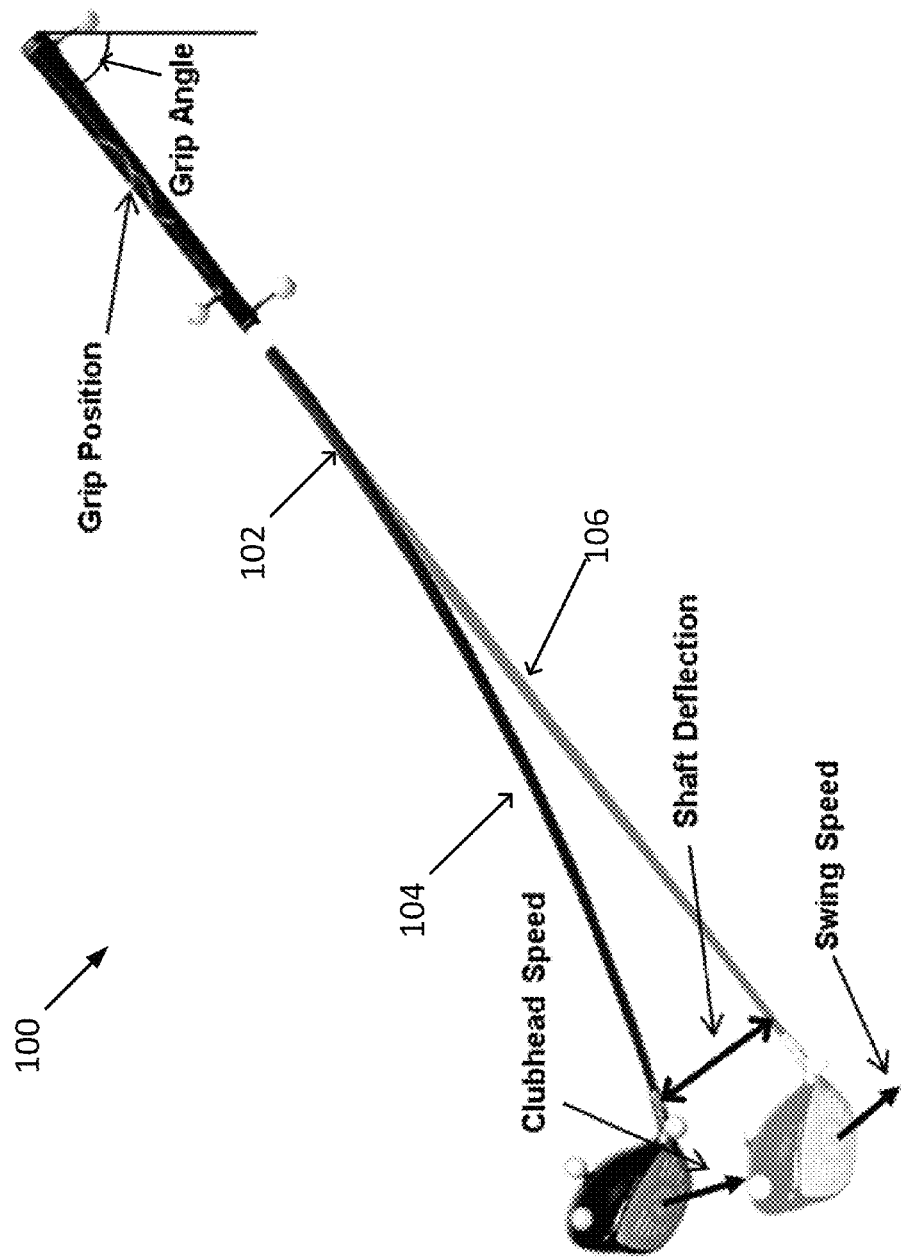
FIG. 1 shows shaft deflection in an exemplary golf club.

FIG. 1 illustrates some of the golf swing metrics. FIG. 1 shows a conventional golf club 100 comprising a flexible shaft 102 with a grip at one end and a club head at the other. While the illustrated golf club 100 is a wood-type club, the disclosed methods and systems can be applied to any type of golf club, including irons and wedges, and are not limited to wood-type clubs. As the club 100 is swung, the shaft deflects in the plane of the swing. In FIG. 1, a deflected configuration 104 of the club 100 is shown in comparison to a hypothetical configuration 106 that the club would assume if the shaft 102 was perfectly rigid with the same grip position and grip angle. Shaft deflection can be defined as the distance between a given distal point on the shaft 102 in the deflected configuration 104 relative to where that point would lie in the hypothetical configuration 106 if there were no shaft deflection. In this disclosure, only the values of shaft deflection that lie in the swing plane are considered. Positive shaft deflection can be defined as deflection away from golf ball impact location. In FIG. 1, positive deflection is shown, as the shaft 102 is deflected clockwise away from the ball impact location as the club is rotating counter-clockwise during the downswing. Negative shaft deflection can be defined as deflection in the swing plane toward the golf ball impact location (i.e., counter-clockwise in the view of FIG. 1). Negative shaft deflection often occurs during the initial portion of the backswing, for example, as the clubhead lags behind the hand rotation.

Kick velocity can be defined as the negative of the rate of change of shaft deflection. If the shaft deflection is increasing (becoming more positive or less negative) at a given moment, then the kick velocity is negative, and conversely, if the shaft deflection is decreasing, the kick velocity is positive. Often, kick velocity is measured specifically at the moment of impact with the golf ball. For example, if at impact there is a positive shaft deflection (the club head is trailing the hands) and the shaft deflection is decreasing (becoming closer to a straight shaft configuration), then the kick velocity is positive. On the other hand, if at impact there is a negative shaft deflection (the club head is ahead of the hands) and the shaft deflection is increasing toward zero (getting closer to a straight shaft configuration), then the kick velocity is negative.

Swing speed can be defined as the hypothetical speed of the centerface of the clubhead assuming a perfectly rigid shaft with no deflection. Swing speed thus ignores kick velocity and is instead dependent on the angular velocity of the grip portion of the club and the length of the club. In some cases, the swing speed can be related linearly to a product of the rate of change of the grip angle (see FIG. 1) and the radius from the center of the swing plane rotation to the centerface of the clubhead.

The clubhead speed is the actual speed of the centerface of the club head relative to the stationary ball. The clubhead speed can be defined as approximately the sum of the swing speed and the kick velocity. While other factors can influence the actual clubhead speed (such as rotational motion of the clubhead about the shaft axis and out-of-swing-plane motion), in this disclosure such other factors are not considered and clubhead speed is generally assumed to approximate the sum of swing speed and kick velocity. For a given swing speed, a positive kick velocity increases the clubhead speed and a negative kick velocity reduces the clubhead speed.

Figure 2:
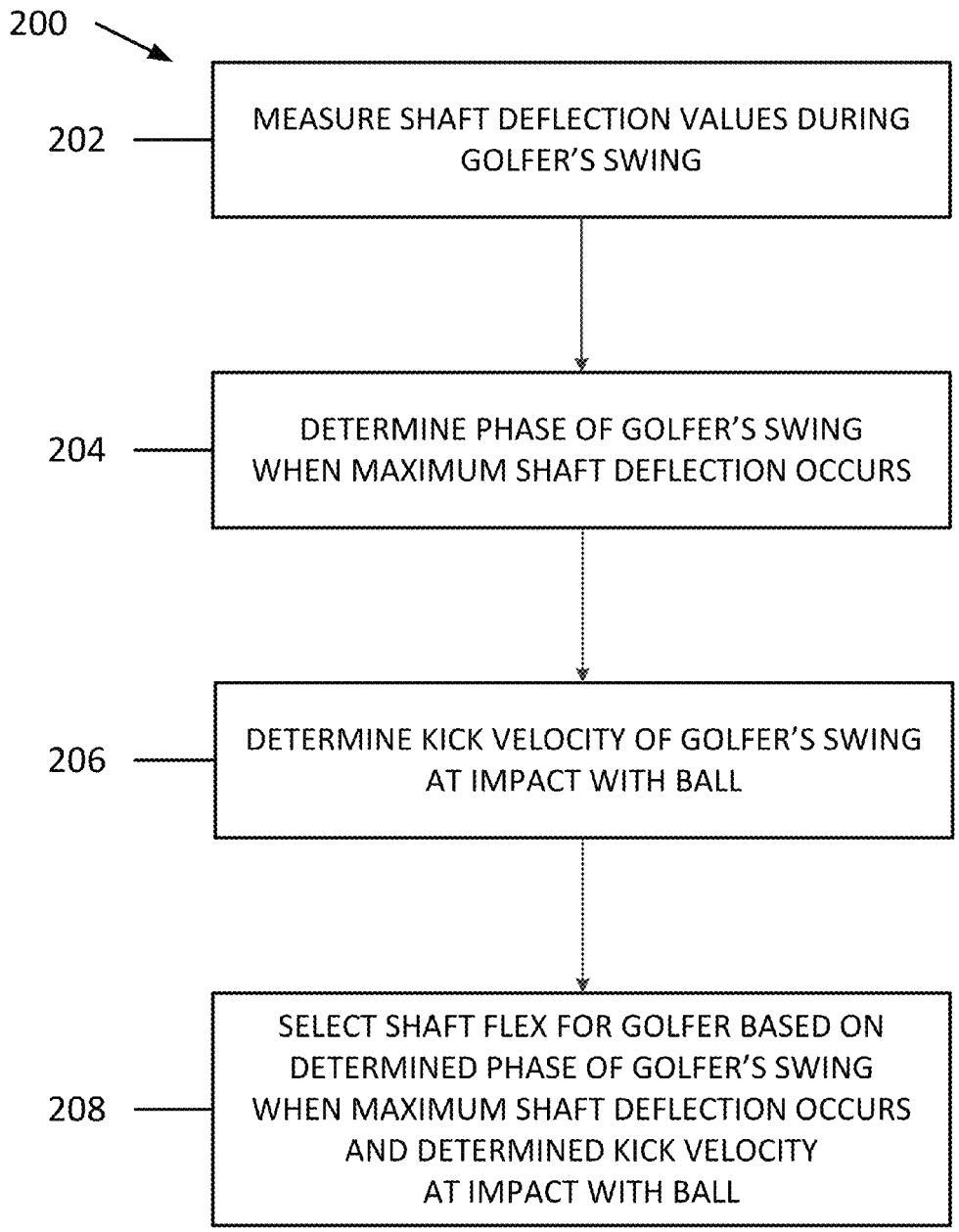
FIG. 2 shows an exemplary method for selecting a shaft flex for a golfer.

FIG. 2 illustrates an exemplary method 200 for selecting a shaft flexibility for a golfer. At 202, shaft deflection values are measured during the golfer's swing. At 204, the phase of the golfer's swing when maximum shaft deflection occurs can be determined. At 206, the kick velocity of the golfer's swing at impact can be determined. And at 208, a shaft flex can be selected for the golfer based on the determinations from 204 and 206.

Figure 6:
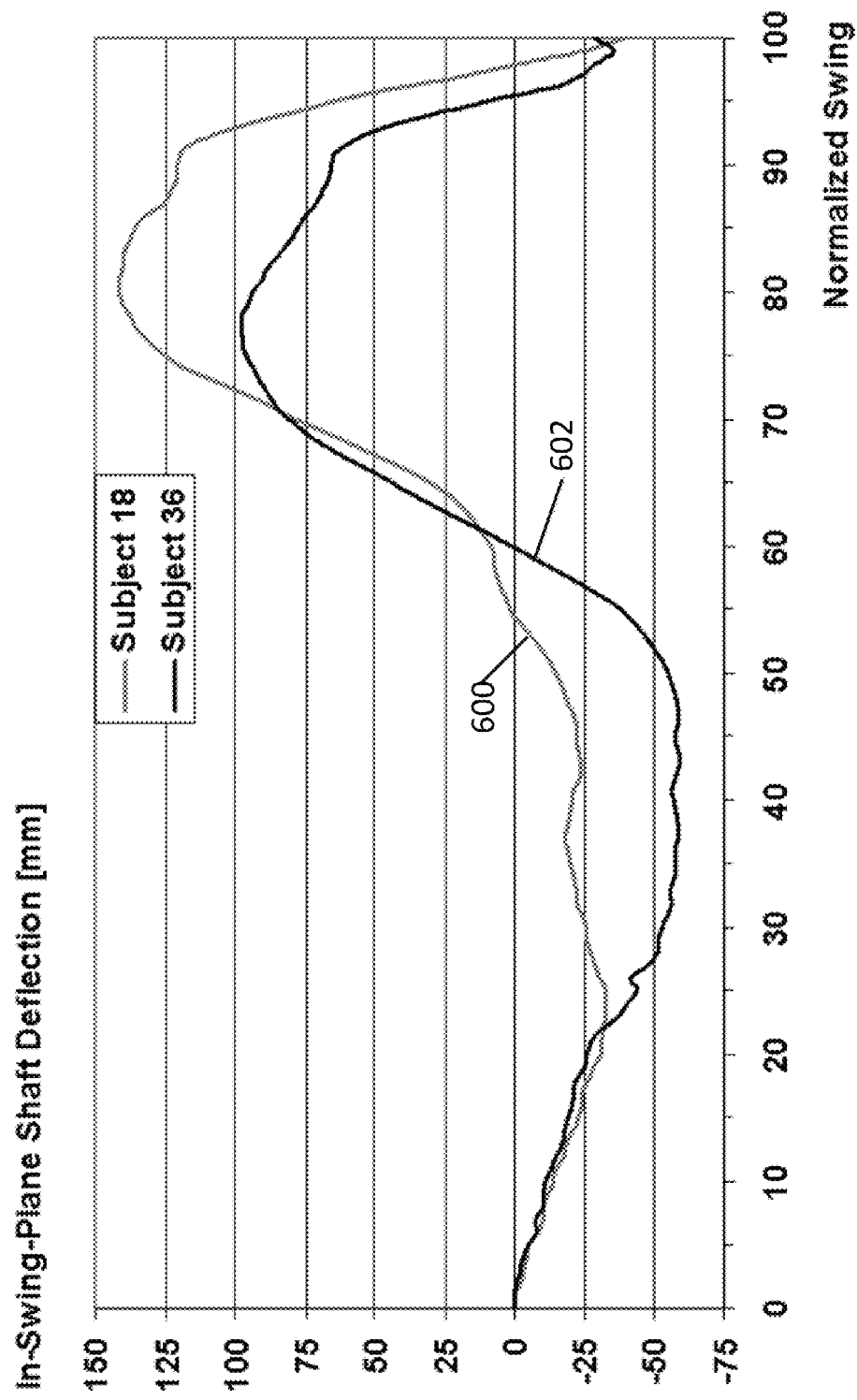
FIG. 6 shows two exemplary deflection profiles, one having positive kick velocity at impact, and the other having negative kick velocity at impact.

The shaft deflection values can be measured while the golfer swings any club. The values for shaft deflection can be measured versus time, creating a shaft deflection profile, such as starting from initiation of the backswing until impact with the ball, or later in the swing. Shaft deflection values during the swing can be measured and recorded in any practical way, such as is described below in relation to FIG. 3. In some embodiments, shaft deflection values can be measured during just one swing, while in other embodiments, shaft deflection values can be measured during plural swings. Shaft deflection values over plural swings can be statistically processed, such as by averaging and/or other methods, to produce a single shaft deflection profile for the golfer's swing. In some embodiments, the duration of the golfer's swing can be normalized and represented as a percentage of the swing, such as with 0% representing the initiation of the backswing and 100% representing impact with the ball. FIG. 6 shows an exemplary shaft deflection profile showing in-swing-plane shaft deflection in millimeters on the Y-axis and normalized swing duration on the X-axis for two different golfers' swings, with 0 being backswing initiation and 100 being impact with the ball.

Figure 8:
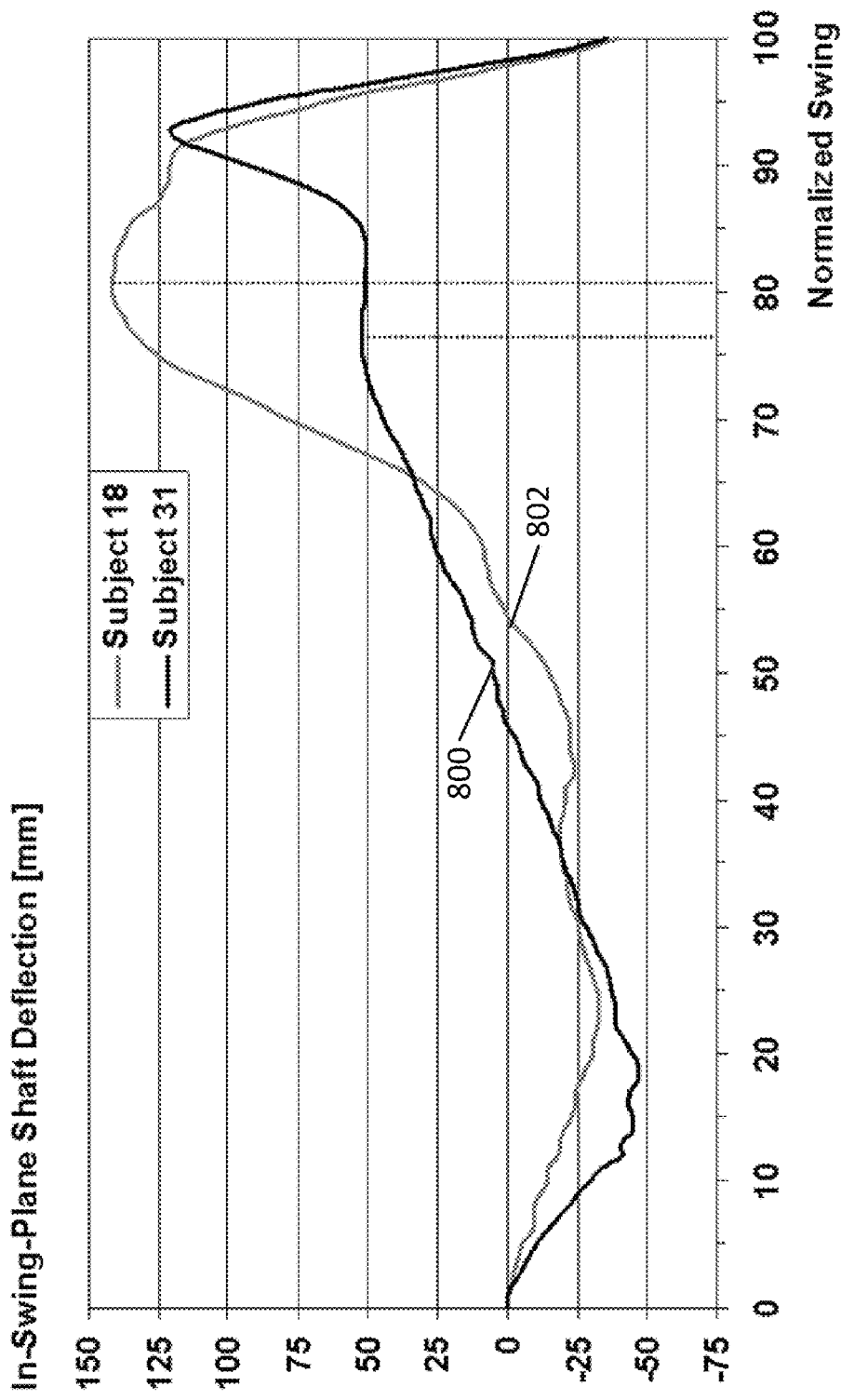
FIG. 8 shows two exemplary deflection profiles, one having maximum shaft deflection at the top of the backswing, the other during the downswing.

From a shaft deflection profile, the point or phase during the swing when maximum shaft deflection occurs can be determined. For example, in the example of FIG. 6, maximum deflection for the profile 600 occurs at around 80% of the swing, and maximum deflection for the profile 602 occurs at around 75% of the swing. In some swing types, maximum deflection occurs at or near the top of the backswing, while in other swing types, maximum deflection occurs during the downswing. FIG. 8 shows an example of each of these two swing types. For each profile 800 and 802, the vertical dotted line represents the top of the backswing. In the profile 800, maximum deflection occurs at around 92% of the swing, which is during the downswing well after the top of the backswing, which occurs at around 77% of the swing. On the other hand, in the profile 802, maximum deflection occurs at the top of the backswing, around 81% of the swing.

From the shaft deflection profile, the golfer's kick velocity profile can also be determined over the course of the swing. Using the chart of FIG. 6 as an example, down slopes in the shaft deflection profile equate to positive kick velocity and up slopes equate to negative kick velocity. Steeper slopes equate to greater kick velocity magnitude. Of particular interest is the kick velocity of the swing at impact with the ball. Greater positive kick velocity at impact is often desirable as greater kick velocity can lead to greater overall clubhead speed at impact, which can lead to higher initial speed of the golf ball just after impact, increased spin, increased loft angle, and/or other differences in shot properties. In some swing types, the kick velocity at impact is positive, and in other swing types the kick velocity at impact is negative. Referring to FIG. 6 for example, the swing profile 600 has a negative slope at 100%, which means there is a positive kick velocity at impact. On the other hand, the swing profile 602 has a positive slope at impact, which means there is a negative kick velocity at impact. A closer look at profile 602 shows that there was a positive kick velocity from about 75% to about 98% of the swing (most of the downswing), but the kick velocity turned negative just before impact at about 98% of the swing. This shows that the clubhead reached a most negative deflection point (farthest ahead of the hands) around 98% and then began to recoil back toward a straight shaft configuration just before impact, producing a negative kick velocity, which reduces the overall clubhead speed at impact to less than the swing speed at impact.

Based on the phase of a golfer's swing when maximum deflection occurs and whether there is a positive or negative kick velocity at impact, a shaft flex can be selected for the golfer. The shaft flex can be selected to provide any of various swing characteristics or ball flight characteristics. For example, the shaft flex can be selected to provide the maximum clubhead speed at impact.

In some methods, a shaft flex can be selected from among a group of plural different available shaft flex options. For example, a shaft flex can be selected from among a group of five different options, each having a different set of known characteristics. Any other group of plural different shaft flex options can also be employed. FIG. 4 shows characteristics for an exemplary group of five shaft options each having the same length but different flexibilities. Shaft L is the most flexible option, A is the next most flexible, R is the next most flexible, S is the next most flexible, and X is the least flexible option. In other methods, fewer than or more than five different shaft flex options are available.

Figure 5:
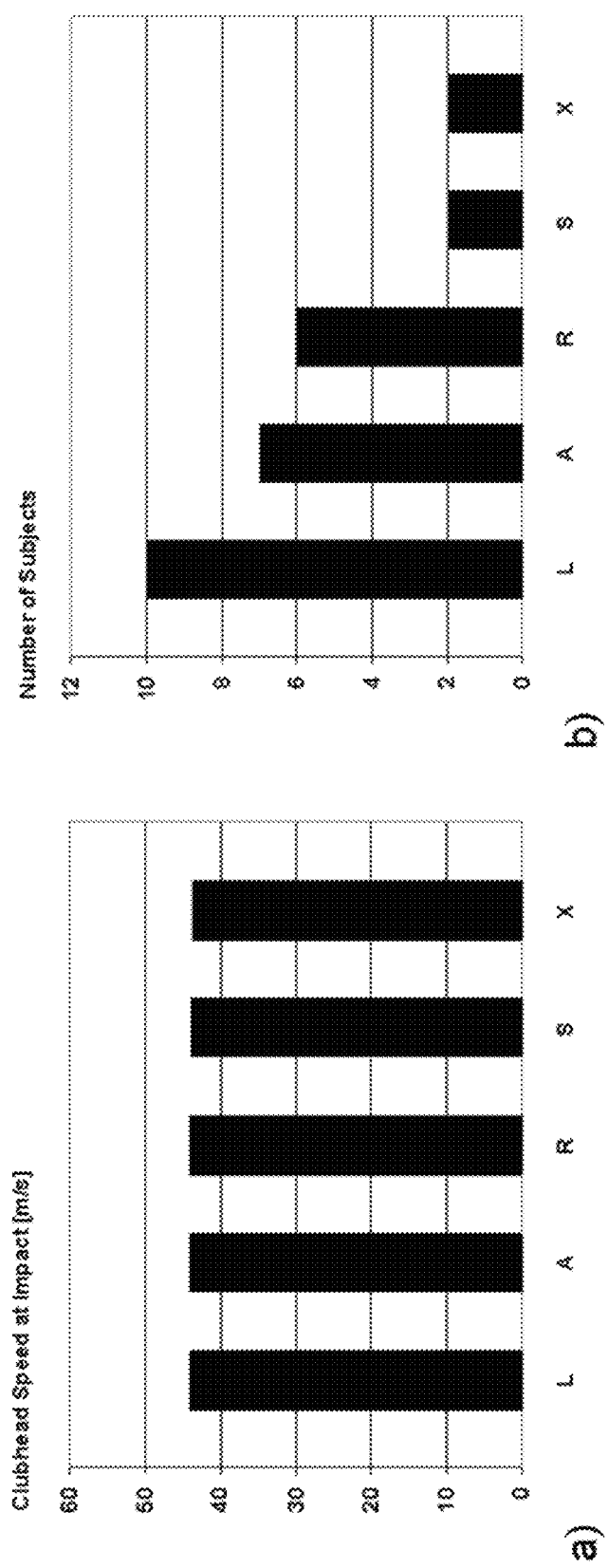
FIG. 5a shows test data regarding clubhead speed at impact versus shaft flexibility.
FIG. 5b shows the number of a group of test subjects having a maximum clubhead speed at impact for each of shafts of FIG. 4.

FIGS. 5a and 5b show data from swing tests performed with 40 different golfer subjects each swinging a set of five clubs in turn where the only difference between the five clubs is each club includes a different one of the five shaft options shown in FIG. 4. As shown in FIG. 5a, the average measured clubhead speed was about equal for each of the five different shaft flexes. FIG. 5b shows the number of the 40 subjects who achieved the highest clubhead speed with each flex. While more of the subjects had their highest clubhead speed with the more flexible shaft options, at least two of the subjects had their highest clubhead speed with every one of the five flex options.

Figure 7:
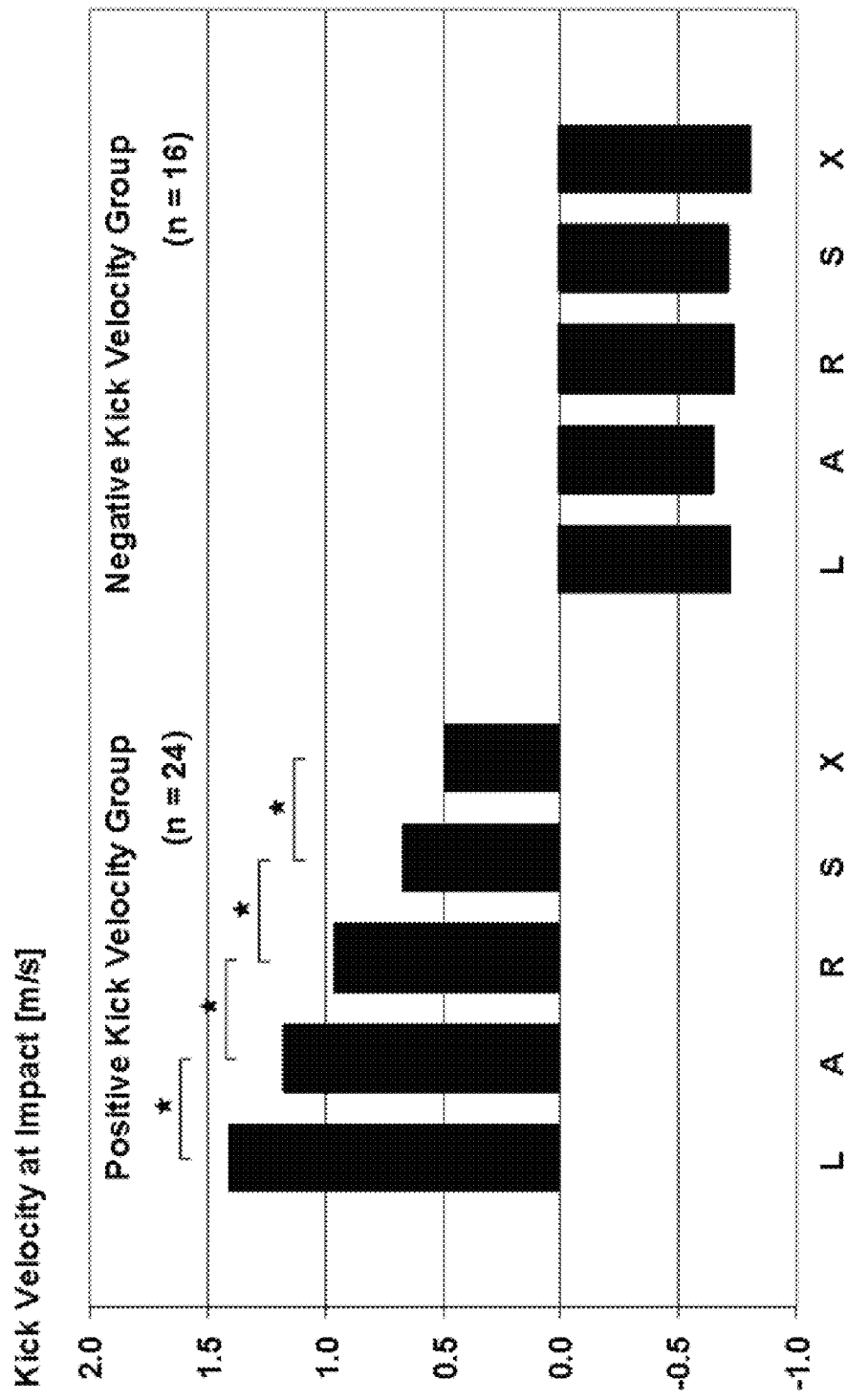
FIG. 7 shows kick velocity at impact across different shaft flexes for the positive kick velocity group and for the negative kick velocity group.

As described above, FIG. 6 shows an exemplary deflection profile 600 having a positive kick velocity at impact, and another exemplary deflection profile 602 having a negative kick velocity at impact. Generally, all of the test subjects can be categorized into one of these two groups (i.e., either positive or negative kick velocity at impact.) FIG. 7 shows kick velocity at impact for each of these two groups, and for each shaft flex option. For the positive kick velocity group, the flexibility of the shaft contributes to clubhead speed, with the more flexible shafts having higher kick velocity at impact and thus contributing more to clubhead speed. For the negative kick velocity group, shaft flexibility decreased clubhead speed compared to if there was no shaft flexibility at all. The clubhead speed decrease was about the same for each shaft flex because the negative kick velocity at impact was about the same for each of the five different shaft flexes.

Figure 9:
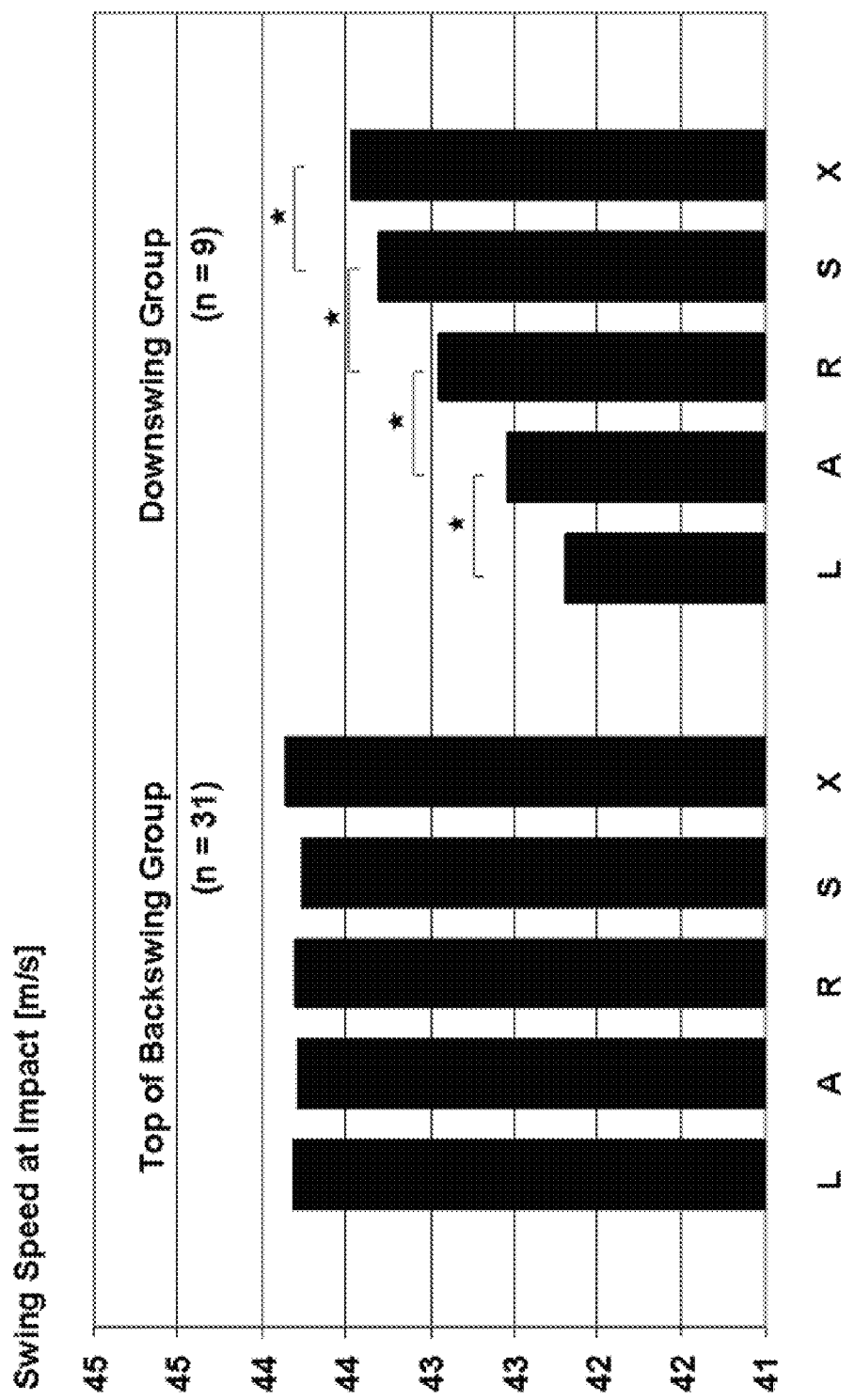
FIG. 9 shows kick velocity at impact across different shaft flexes for the top of backswing group and for the downswing group.

As described above, FIG. 8 shows an exemplary deflection profile 800 having maximum lag deflection during the downswing, and an exemplary deflection profile 802 having a maximum lag deflection at or near the top of the backswing. Generally, all of the test subjects can be categorized into one of these two groups as well (i.e., either maximum deflection at top of backswing or during downswing.) As shown in FIG. 9, for the group having maximal lag deflection at the top of the backswing, shaft flex has no substantial influence on the swing speed of the subjects at impact. For the group that imparts the maximum lag deflection during the downswing, shaft flex does have an influence on swing speed; the more flexible shafts decrease the swing speed to a larger extent.

However, similar to the two kick velocity groups, neither of these two maximum deflection groups has a substantial overall change in clubhead speed across the different shaft flexes. Thus, simply categorizing a golfer's swing based on kick velocity at impact alone, or based on the phase of the swing having maximum shaft deflection, may not be sufficient to enable selection of a shaft flex that provides the greatest overall clubhead speed at impact.

Figure 10:
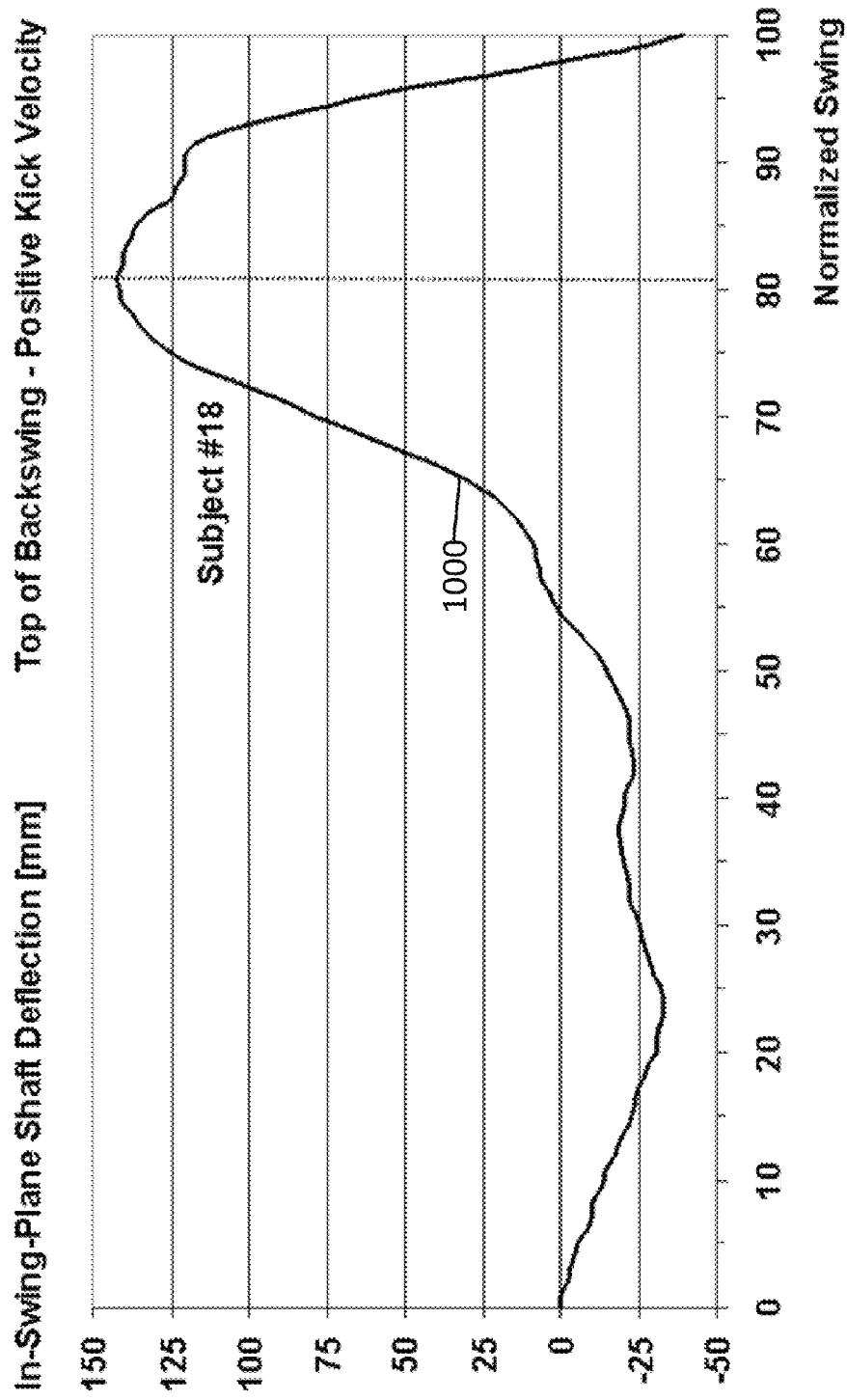
FIG. 10 shows an exemplary deflection profile for a swing that falls into the top-positive group.
Figure 11:
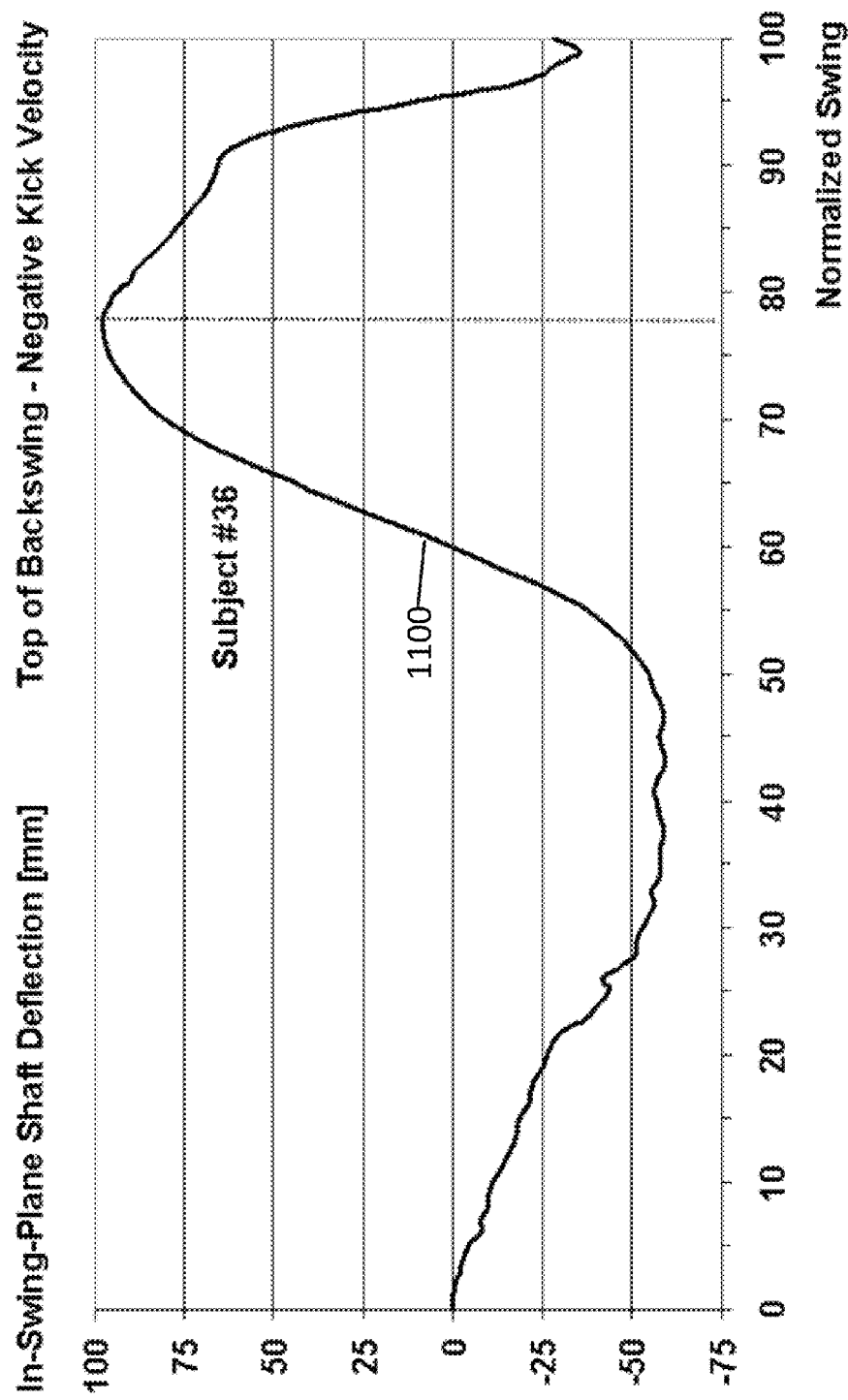
FIG. 11 shows an exemplary deflection profile for a swing that falls into the top-negative group.
Figure 12:
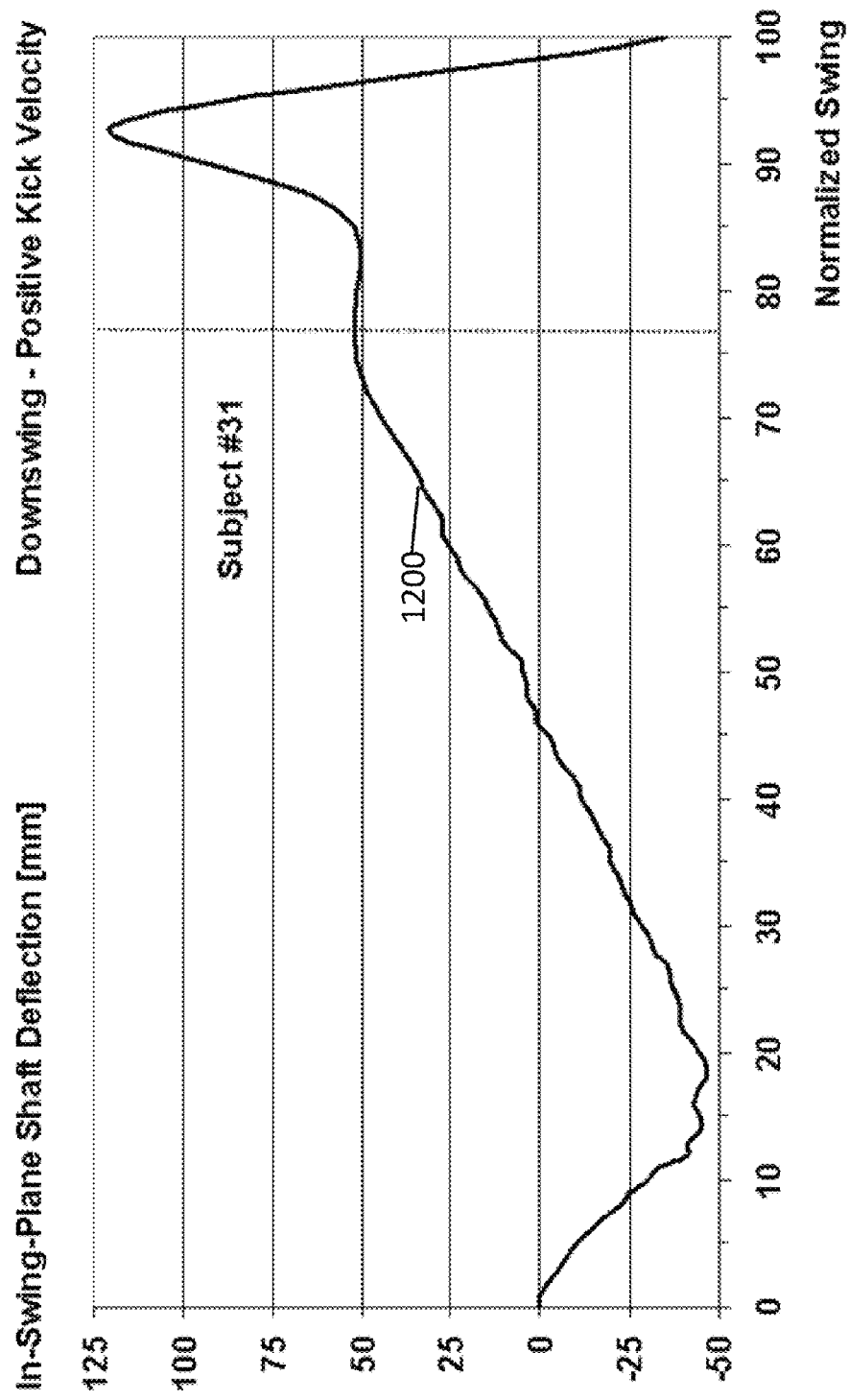
FIG. 12 shows an exemplary deflection profile for a swing that falls into the down-positive group.
Figure 13:
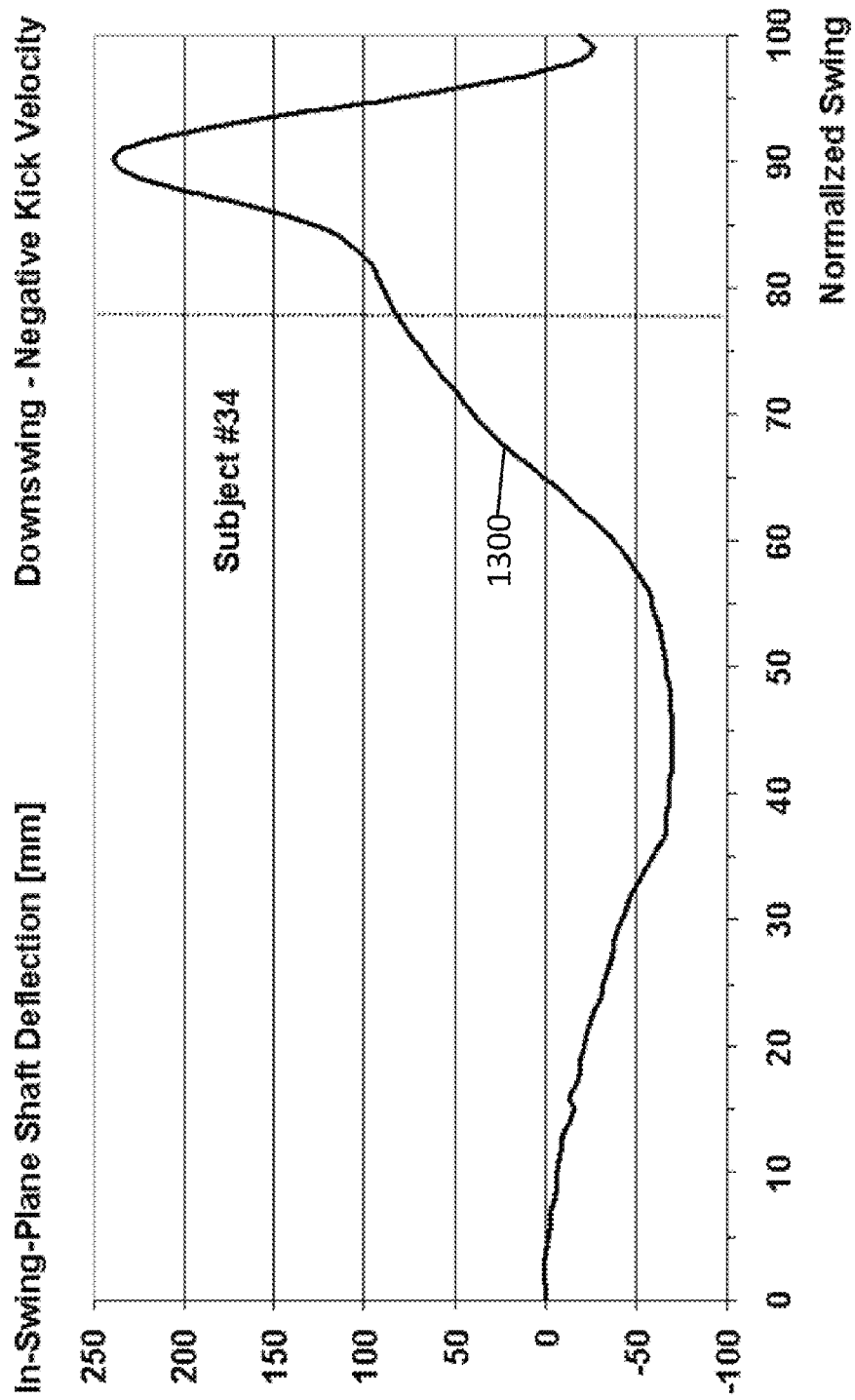
FIG. 13 shows an exemplary deflection profile for a swing that falls into the down-negative group.

However, combining these two categorizations into four distinct groups can provide a sufficient correlation to enable selection of a shaft flex from among the five flex options that provides the greatest overall clubhead speed at impact for a particular golfer. The four swing groups are: maximum deflection at or near top of backswing with positive kick velocity ("top-positive"), maximum deflection at or near top of backswing with negative kick velocity ("top-negative"), maximum deflection during the downswing with positive kick velocity ("down-positive"), and maximum deflection during the downswing with negative kick velocity ("down-negative"). FIG. 10 shows a deflection profile 1000 for an exemplary golf swing that falls into the top-positive group. Of the 40 test subjects, 18 are in this group. FIG. 11 shows a deflection profile 1100 for an exemplary golf swing that falls into the top-negative group. Of the 40 test subjects, 13 are in this group. FIG. 12 shows a deflection profile 1200 for an exemplary golf swing that falls into the down-positive group. Of the 40 test subjects, 6 are in this group. FIG. 13 shows a deflection profile 1300 for an exemplary golf swing that falls into the down-negative group. Of the 40 test subjects, 3 are in this group. The vertical dotted lines show the top of the backswing for each of these profiles.

Figure 14:
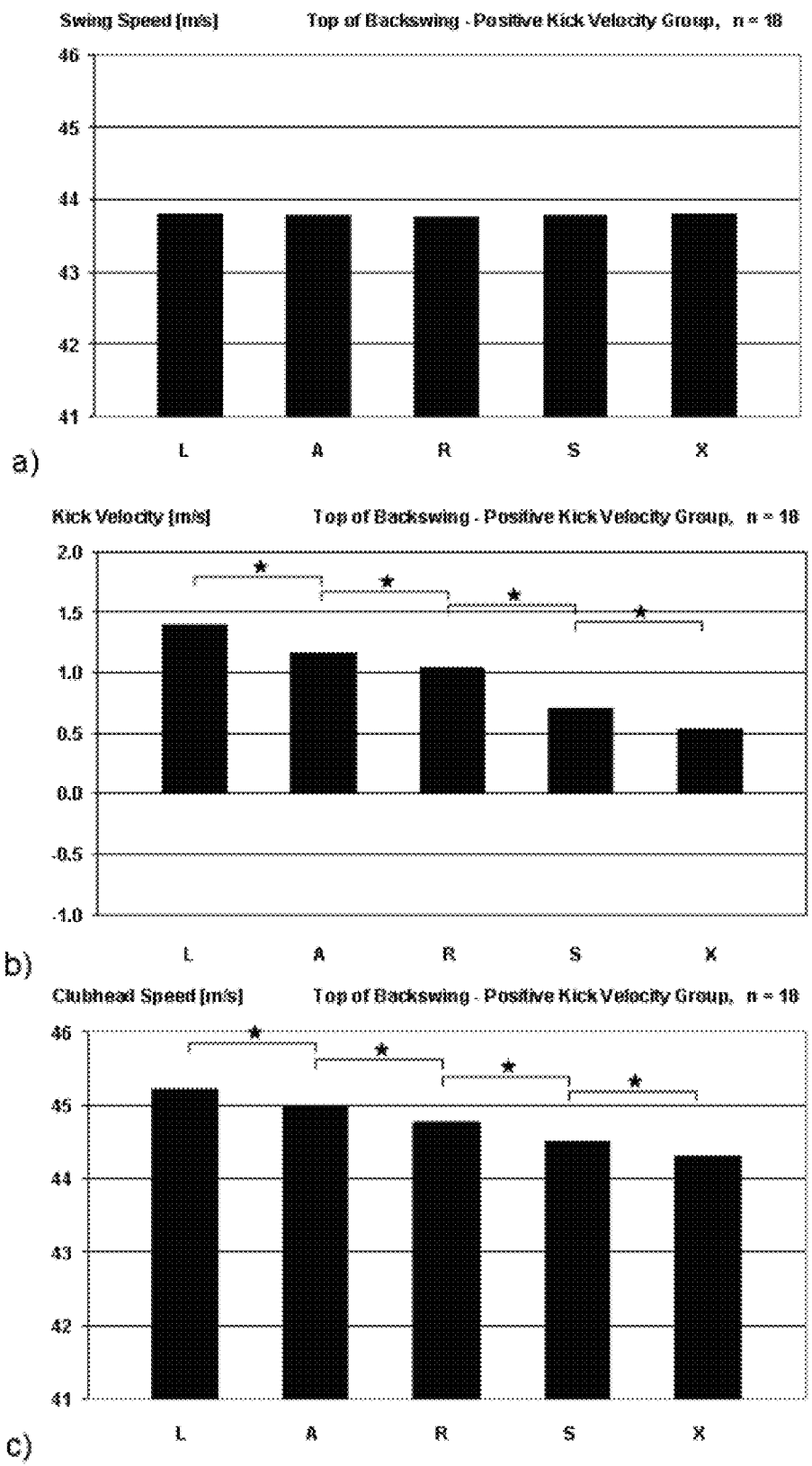
FIG. 14a-14c show average swing speed, kick velocity at impact, and clubhead speed at impact, respectively, versus shaft flexibility for the top-positive group.

FIGS. 14a-14c show swing speed, kick velocity, and clubhead speed, respectively, across each shaft flex for the top-positive group. Swing speed is about even for each shaft flex, but kick velocity is significantly greater for each successively more flexible shaft, with the L shaft producing the greatest positive kick velocity. Consequently, the clubhead speed at impact is significantly greater for each successively more flexible shaft, with the L shaft producing the greatest positive kick velocity. The difference in clubhead speed is greater than 2% between the L and X shafts, for example. Thus, for a golfer having a swing that is categorized into the top-positive group, a most flexible shaft flex can be chosen from among the available options to provide the greatest clubhead velocity at impact.

Figure 15:
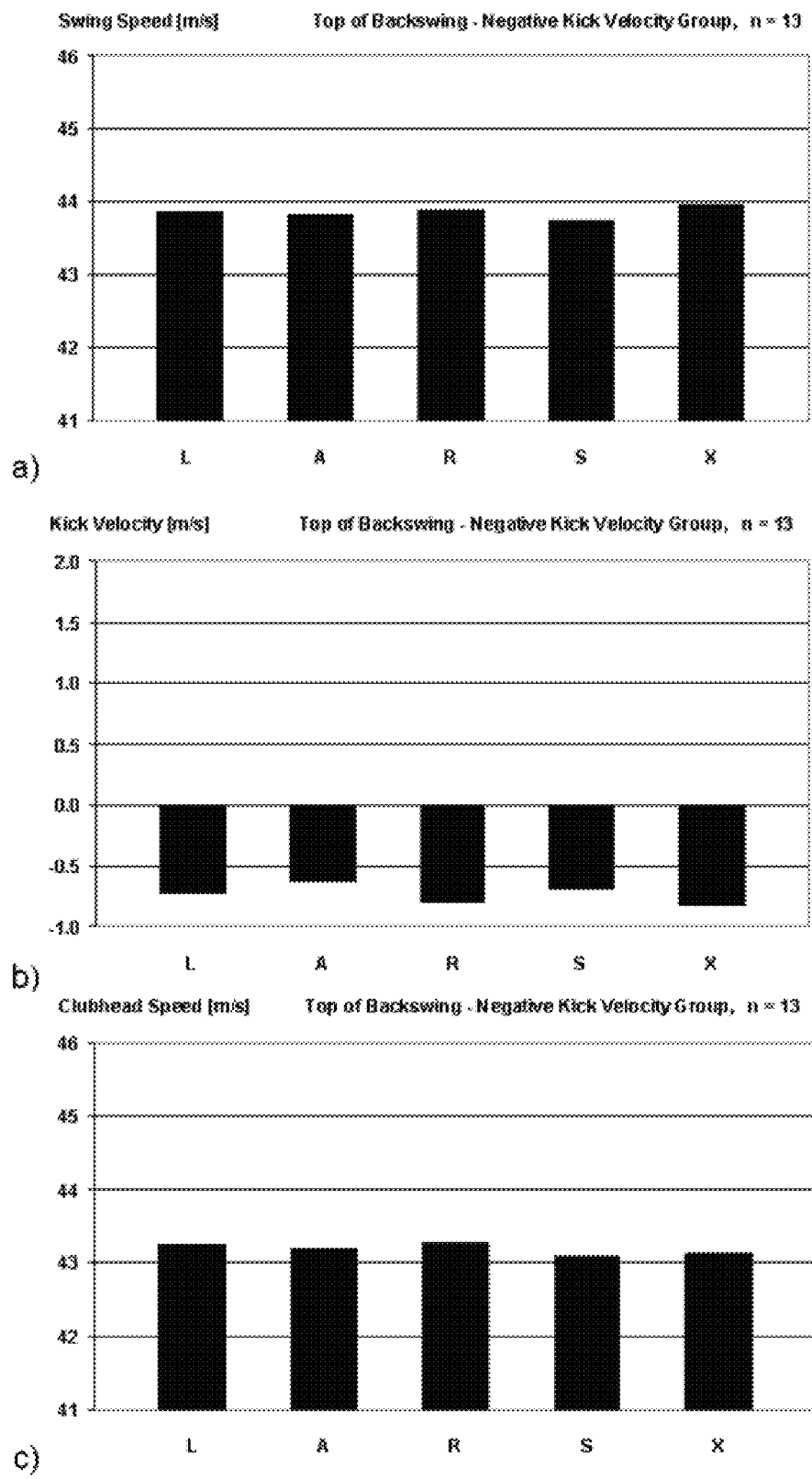
FIG. 15a-15c show average swing speed, kick velocity at impact, and clubhead speed at impact, respectively, versus shaft flexibility for the top-negative group.

FIGS. 15a-15c show swing speed, kick velocity, and clubhead speed, respectively, across each shaft flex for the top-negative group. In this group, swing speed is about even across each flex, and the negative kick velocity is about even across each flex. Consequently, the clubhead speed at impact for the top-negative group is about even for each flex. Thus, for a golfer whose swing is categorized into the top-negative category, any of the available shaft flexes can be selected as they can all be expected to provide about the same clubhead speed at impact.

Figure 16:
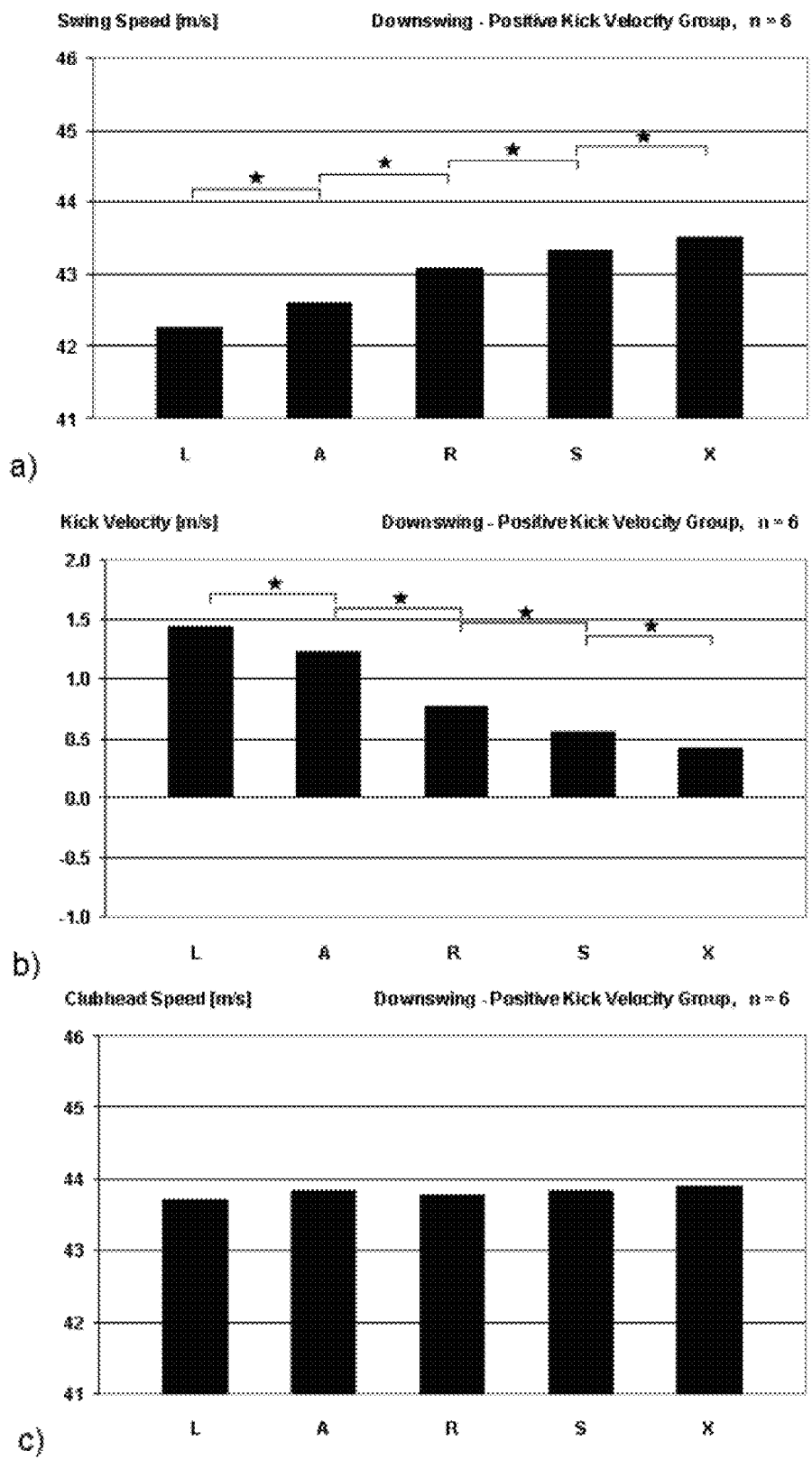
FIG. 16a-16c show average swing speed, kick velocity at impact, and clubhead speed at impact, respectively, versus shaft flexibility for the down-positive group.

FIGS. 16a-16b show swing speed, kick velocity, and clubhead speed, respectively, across each shaft flex for the down-positive group. In this group, swing speed is significantly greater for each successively less flexible shaft, with the X shaft producing the greatest swing speed. On the other hand, kick velocity is significantly greater for each successively more flexible shaft, with the L shaft producing the greatest positive kick velocity. These two opposite factors substantially cancel out for each flex and produce a generally even overall clubhead speed at impact across each flex, as shown in FIG. 16c. Thus, for a golfer having a swing that is categorized into the down-positive group, any of the available shaft flexes can be selected as they can all be expected to provide about the same clubhead speed at impact.

Figure 17:
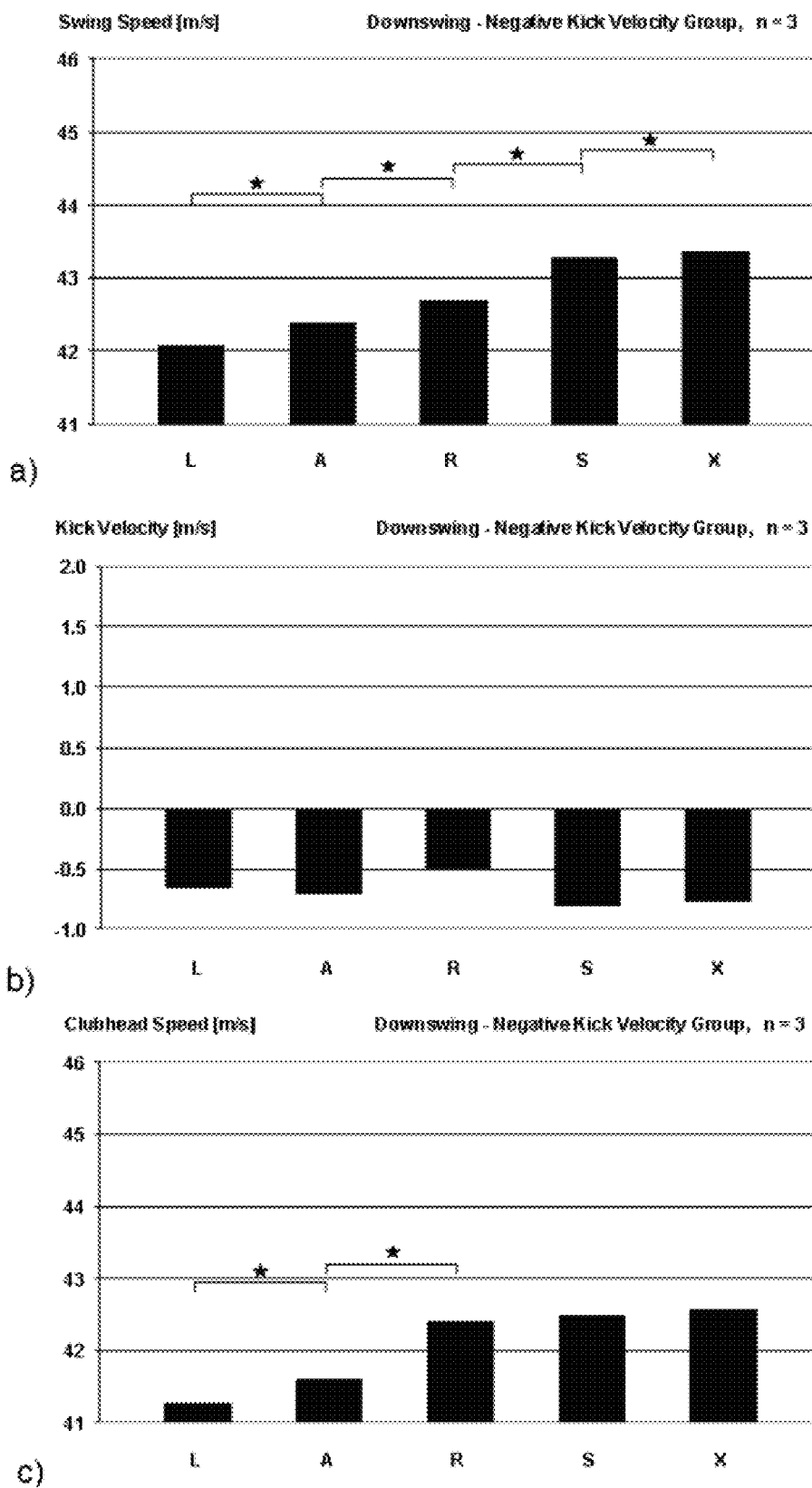
FIG. 17a-17c show average swing speed, kick velocity at impact, and clubhead speed at impact, respectively, versus shaft flexibility for the down-negative group.

FIGS. 17a-17c show swing speed, kick velocity, and clubhead speed, respectively, across each shaft flex for the down-negative group. In this group, swing speed is significantly greater for each successively less flexible shaft, with the X shaft producing the greatest swing speed. Kick velocity, however, vary only marginally from flex to flex, with no significant trend favoring stiffer or more flexible shafts. As a result, the clubhead speed at impact for this group increases with increased stiffness, with the X shaft producing a clubhead speed about 3.1% greater than the L shaft. There is a significant increase in clubhead speed between the L and A shafts, and between the A and R shafts, but only marginal increases in clubhead speed between the R, S, and X shafts. Thus, for a golfer having a swing that is categorized into the down-negative group, a least flexible shaft flex can be chosen from among the available options to provide the greatest clubhead velocity at impact. In other cases, any of the less flexible shaft flexes can be selected, such as any of the R, S, and X flexes.

Figure 3:
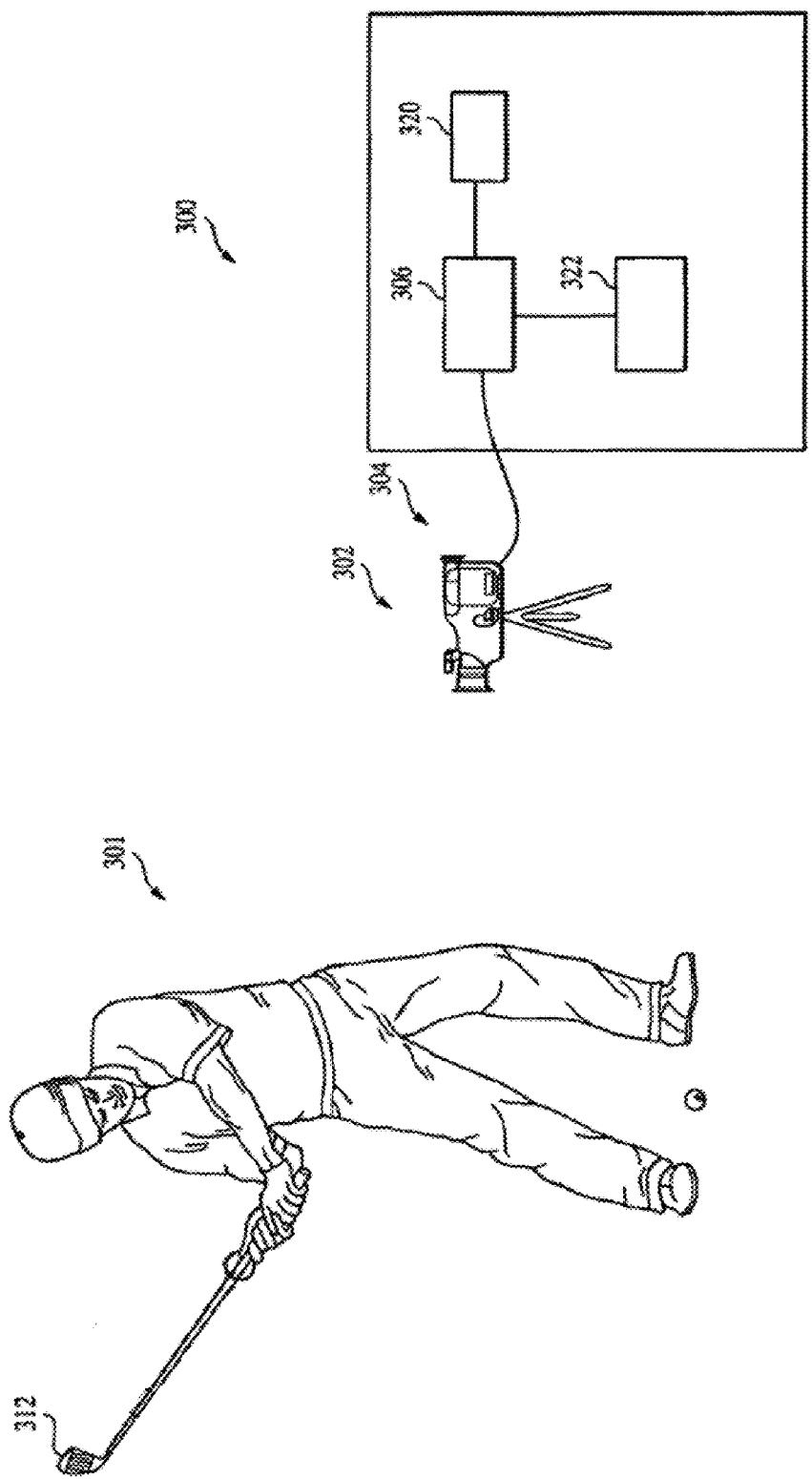
FIG. 3 shows an exemplary system for measuring a golf swing.

FIG. 3 illustrates an arrangement of a golf swing measuring system 300 that can be used to measure the swing of a golfer 301. For example, the golf swing measuring system 300 can be used to measure shaft deflection, kick velocity, clubhead speed, and/or other metrics regarding the golf club 312 over the course of the golfer's swing.

As shown in FIG. 3, the system 300 includes a collection system 302 for collecting swing data from the golfer's swing. This collection system can include a three-dimensional optical motion analysis system 304. The motion analysis system can be electronically connected to a processor 306, which can execute stored computer-executable instructions and can be configured to analyze and/or process various aspects of the collected swing data. For example, the processor 306 can be configured to determine the shaft deflection of the golf club 312 as a function of time during a golf swing and/or determine the clubhead speed of the club 312 during the golf swing.

In one exemplary embodiment, a dual camera system can be used. For example, a first camera system can include plural cameras (e.g., seven cameras) for capturing the entire golf swing. For example, these cameras can operate at 240, 600, or more, frames/second, and can capture a large (e.g., 3 m×3 m×3 m cube) volume around the golfer. Further, a second camera system can include plural cameras (e.g., three cameras) for capturing the golf swing near the impact location. These cameras can operate at 1000 or more frames/second, for example, and can capture a smaller (e.g., shoe-box sized) volume at about the location of the clubhead just prior to the impact with the golf ball.

Accordingly, from the data collected by the three-dimensional motion analysis system 302, the processor 306 can be configured to generate a profile of the in-swing-plane shaft deflection versus swing time (e.g., normalized swing time) and/or other data representations. An example of such a profile is provided in FIG. 10. In some embodiments, locator devices can be attached to various points on the golf club 312 to assist in capturing the swing. The processor 306 can also be configured to generate other swing data, such as kick velocity versus time data, swing speed versus time data, and clubhead speed versus time data.

In an alternative embodiment, a three-dimensional motion analysis system can include measurement devices that do not require optical-based data processing. An example is the use of inertial measurements units in the form of rate gyros or the like, which are attached to a golfer and/or to the golf club. Reduction to desired swing performance values of the measured data as provided in such a system is known to those skilled in the art. Preferably, one feature common to these three-dimensional motion analysis systems is a data sampling rate of at least 120 samples per second, and more preferably at a data sampling rate of at least 200 samples per second. Preferably, the accuracy in measuring the position of a point on a golf club along three axes is within about 5 millimeters at each successive sample. The accuracy in measuring each angle of interest preferably is within about 2 degrees. The accuracy in measuring a rotation velocity of an object of interest preferably is within about 10 degrees/second, and more preferably within about 1.0 degrees/second.

In some embodiments, the collection system 300 can include one or more sensors located on the golf club 312. For example, the golf club 312 can carry strain gauges, accelerometers, magnetic sensors, and/or other sensors for providing club head and/or shaft measurements. Such sensors can be electronically and/or wirelessly connected to the processor 306.

The processor 306 can be connected to one or more memory storage devices 320, which can store raw swing data collected as well as processed output data from the processor 306 as described above. The memory storage device 320 can also store the relationships between golfer characteristics, swing groups, club types, shaft type, shaft flexibility, the raw swing data collected, processed swing data from the processor, and/or any other data, such as in a database or other storage format. The one or more memory storage device 320 can include non-removable memory and/or removable memory. Non-removable memory can include RAM, ROM, flash memory, a hard disk, or other well-known memory storage technologies. The one or more memory storage device 320 can comprise volatile memory (e.g., registers, cache, RAM), non-volatile memory (e.g., ROM, EEPROM, flash memory, etc.), or some combination of the two, accessible by the processor 306. The one or more memory storage device 320 can store software for implementing one or more processes or methods described herein, such as in the form of computer-executable instructions suitable for execution by the processor 306. The one or more memory storage device 302 can comprise any storage medium, such as any medium that can be used to store information in a non-transitory way and/or which can be accessed within the processor 306.

The processor 306 can also be connected to an output device 322 for transmitting and/or displaying raw collected swing data, processed swing data, and/or any other data produced by or stored in the system 300. The output device 322 can comprise a computer screen 324, a printer 326, an electronic disk, a data transmission device, and/or any other type of data handling device. Further, the system 300 can comprise input devices and software that allows for user interaction.

The illustrated system 300 is not intended to suggest any limitation as to scope of use or functionality, as the innovations may be implemented in diverse general-purpose or special-purpose computing systems. For example, the system 300 can comprise any of a variety of computing devices (e.g., desktop computer, laptop computer, server computer, tablet computer, mobile device, etc.).

Although the operations of some of the disclosed methods are described herein in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles disclosed herein may be applied, it should be recognized that the illustrated embodiments are only examples and should not be taken as limiting the scope of the disclosure. Rather, the scope of the disclosure is defined by the following claims. We therefore claim as our invention all that comes within the scope of these claims.

We claim:

1. A method comprising:
   using an electronic measuring system, measuring in-swing-plane shaft deflection values of a golfer's golf club during the golfer's swing;
   determining a phase of the golfer's swing when maximum in-swing-plane shaft deflection occurs;
   determining a kick velocity of the golfer's swing at impact with a golf ball; and
   selecting a shaft flex for the golfer based on the determined phase of the golfer's swing when maximum in-swing-plane shaft deflection occurs and based on the determined kick velocity of the golfer's swing at impact with a golf ball;
   wherein determining a phase of the golfer's swing when maximum in-swing-plane shaft deflection occurs comprises determining whether the maximum shaft deflection occurs at or near the top of the golfer's backswing or during the golfer's downswing.

2. The method of claim 1, wherein determining the kick velocity of the golfer's swing at impact with a golf ball comprises determining whether kick velocity at impact is positive or negative.

3. The method of claim 1, wherein selecting a shaft flex for the golfer comprises selecting one of a plurality of different shaft flexes.

4. The method of claim 3, wherein the plurality of different shaft flexes comprises five different shaft flexes.

5. The method of claim 4, wherein the five different shaft flexes comprise a ladies shaft flex, a seniors shaft flex, a regular shaft flex, a stiff shaft flex, and an extra stiff shaft flex.

6. The method of claim 3, wherein the selected shaft flex provides the greatest clubhead speed at impact for the golfer relative to the other shaft flexes.

7. The method of claim 1, further comprising categorizing the golfer's swing into one of the following swing groups (a)-(d):
   (a) maximum shaft deflection occurs at or near top of backswing and kick velocity at impact is positive;
   (b) maximum shaft deflection occurs at or near top of backswing and kick velocity at impact is negative;
   (c) maximum shaft deflection occurs during downswing and kick velocity at impact is positive; and
   (d) maximum shaft deflection occurs during downswing and kick velocity at impact is negative.

8. The method of claim 7, wherein the selection of a shaft flex for the golfer is based on the swing group of the golfer's swing.

9. The method of claim 8, wherein selecting a shaft flex for the golfer comprises selecting a most flexible shaft flex from among a group of available shaft flexes if the golfer's swing is categorized in swing group (a).

10. The method of claim 8, wherein selecting a shaft flex for the golfer comprises selecting any available shaft flex if the golfer's swing is categorized in swing group (b).

11. The method of claim 8, wherein selecting a shaft flex for the golfer comprises selecting any available shaft flex if the golfer's swing is categorized in swing group (c).

12. The method of claim 8, wherein selecting a shaft flex for the golfer comprises selecting a relatively less flexible shaft flex from among a group of available shaft flexes if the golfer's swing is categorized in swing group (d).

13. A golf swing measuring system comprising:
   a golf swing data collection system configured to measure in-swing-plane shaft deflection values of a golfer's golf club during the golfer's swing; and
   a computing system configured to:
      determine a phase of the golfer's swing when maximum in-swing-plane shaft deflection occurs;
      determine a kick velocity of the golfer's swing at impact with a golf ball; and
      select a shaft flex for the golfer based on the determined phase of the golfer's swing when maximum in-swing-plane shaft deflection occurs and based on the determined kick velocity of the golfer's swing at impact with a golf ball;
   wherein the computing system is configured to determine whether maximum in-swing-plane shaft deflection occurs at or near the top of the golfer's backswing or during the golfer's downswing.

14. The system of claim 13, wherein the computing system is configured to determining whether kick velocity at impact is positive or negative.

15. The system of claim 13, wherein the computing system is configured to categorize the golfer's swing into one of the following swing groups (a)-(d):
   (a) maximum shaft deflection occurs at or near top of backswing and kick velocity at impact is positive;
   (b) maximum shaft deflection occurs at or near top of backswing and kick velocity at impact is negative;
   (c) maximum shaft deflection occurs during downswing and kick velocity at impact is positive; and
   (d) maximum shaft deflection occurs during downswing and kick velocity at impact is negative.

16. The system of claim 15, wherein the computing system is configured to select a shaft flex for the golfer is based on the swing group of the golfer's swing, and wherein the computing system is configured to:
   select a most flexible shaft flex from among a group of available shaft flexes if the golfer's swing is categorized in swing group (a);
   select any available shaft flex if the golfer's swing is categorized in swing group (b);
   select any available shaft flex if the golfer's swing is categorized in swing group (c); and
   select a relatively less flexible shaft flex from among a group of available shaft flexes if the golfer's swing is categorized in swing group (d).

17. A non-transitory computer-readable storage device having stored therein computer-readable instructions for execution of a method by computing device, the method comprising:
   using an electronic measuring system, measuring in-swing-plane shaft deflection values of a golfer's golf club during the golfer's swing;
   determining a phase of the golfer's swing when maximum in-swing-plane shaft deflection occurs;

determining a kick velocity of the golfer's swing at impact with a golf ball; and selecting a shaft flex for the golfer based on the determined phase of the golfer's swing when maximum in-swing-plane shaft deflection occurs and based on the determined kick velocity of the golfer's swing at impact with a golf ball;

wherein the method further comprises categorizing the golfer's swing into one of the following swing groups (a)-(d):

(a) maximum shaft deflection occurs at or near top of backswing and kick velocity at impact is positive;

(b) maximum shaft deflection occurs at or near top of backswing and kick velocity at impact is negative;

(c) maximum shaft deflection occurs during downswing and kick velocity at impact is positive; and (d) maximum shaft deflection occurs during downswing and kick velocity at impact is negative.

\* \* \* \* \*